US010228752B2

(12) United States Patent
Jouin et al.

(10) Patent No.: US 10,228,752 B2
(45) Date of Patent: *Mar. 12, 2019

(54) VOLTAGE SCALING SYSTEM WITH SLEEP MODE

(71) Applicant: Atmel Corporation, San Jose, CA (US)

(72) Inventors: Sebastien Jouin, La Chapelle-Launay (FR); Romain Oddoart, Petit-Mars (FR); Patrice Menard, Saint-Mars-du-Desert (FR); Mickael Le Dily, Carquefou (FR); Thierry Gourbilleau, Le Loroux-Bottereau (FR)

(73) Assignee: Atmel Corporation, San Jose, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 15/082,056

(22) Filed: Mar. 28, 2016

(65) Prior Publication Data

US 2016/0274654 A1 Sep. 22, 2016

Related U.S. Application Data

(63) Continuation of application No. 13/614,468, filed on Sep. 13, 2012, now Pat. No. 9,298,237.

(51) Int. Cl.

| | |
|---|---|
| ***G06F 1/32*** | (2006.01) |
| ***G06F 1/3296*** | (2019.01) |
| ***G06F 1/26*** | (2006.01) |
| ***G06F 9/4401*** | (2018.01) |
| ***G06F 13/24*** | (2006.01) |

(52) U.S. Cl.

CPC ............ *G06F 1/3296* (2013.01); *G06F 1/266* (2013.01); *G06F 9/4418* (2013.01); *G06F 13/24* (2013.01); *Y02D 10/172* (2018.01); *Y02D 50/20* (2018.01)

(58) Field of Classification Search

None

See application file for complete search history.

(56) References Cited

U.S. PATENT DOCUMENTS 5,337,284 A 8/1994 Cordoba et al.
5,471,432 A 11/1995 Makihara (Continued)

OTHER PUBLICATIONS

U.S. Appl. No. 13/592,173, Restriction Requirement dated May 9, 2013.

(Continued)

*Primary Examiner* — Paul Yen

(74) *Attorney, Agent, or Firm* — Fish & Richardson P.C.

(57) ABSTRACT

A voltage scaling system can scale a supply voltage while preventing processor access of system components that are rendered unstable from the scaling. A processor receives an instruction to scale a system supply voltage to a target supply voltage. The processor executes the instruction and enters into a sleep mode. The processor can send, to a controller that saves power, an indication that the processor is in the sleep mode. When the processor is in the sleep mode, the processor becomes inactive and cannot access any components, e.g., Flash memory data, of the voltage scaling system. The controller can configure a voltage regulator to scale the system supply voltage to the target supply voltage. Once the target supply voltage is reached, the voltage regulator sends an interrupt to the processor, thereby waking up the processor from the sleep mode.

20 Claims, 3 Drawing Sheets

(56) References Cited

U.S. PATENT DOCUMENTS 5,568,083 A 10/1996 Uchiyama et al.
5,867,718 A * 2/1999 Intrater ................. G06F 1/3215 713/323
5,936,455 A 8/1999 Kobayashi et al.
6,175,531 B1 1/2001 Buck et al.
6,195,298 B1 2/2001 Furutani et al.
6,348,833 B1 2/2002 Tsujimoto et al.
6,457,082 B1 9/2002 Zhang et al.
6,785,829 B1 * 8/2004 George ..................... G06F 1/08 713/300
6,956,429 B1 10/2005 Elbanhawy
7,755,410 B2 7/2010 Oh et al.
8,575,997 B1 11/2013 Le Dily et al.
9,274,538 B2 3/2016 Le Dily et al.
9,298,237 B1 3/2016 Jouin et al.
9,317,095 B1 4/2016 Jouin et al.
2002/0126561 A1 9/2002 Rooparvar
2003/0210026 A1 11/2003 Clark
2004/0181643 A1 9/2004 Micheloni et al.
2005/0218871 A1 10/2005 Kang et al.
2005/0223259 A1 10/2005 Lehwalder et al.
2007/0030057 A1 * 2/2007 Wang ................. H03K 19/0016 327/554
2007/0115044 A1 5/2007 Chan et al.
2007/0274148 A1 11/2007 Nitta et al.
2008/0049505 A1 2/2008 Kim et al.
2008/0067998 A1 3/2008 Lee et al.
2009/0187773 A1 * 7/2009 Pastorello ............. G06F 1/3203 713/300
2011/0157976 A1 6/2011 Kuriyama
2011/0235457 A1 9/2011 Hirata
2013/0166934 A1 6/2013 Chu

OTHER PUBLICATIONS

U.S. Appl. No. 13/592,173, Notice of Allowance dated Jul. 2, 2013.
U.S. Appl. No. 14/042,303, Non-Final OA dated May 28, 2014 (10 pages).
U.S. Appl. No. 14/042,303, Final Office Action dated Nov. 13, 2014, 11 pages.
U.S. Appl. No. 13/614,467, Non-Final OA, dated Dec. 23, 2014, 14 pages.
U.S. Appl. No. 13/614,468, Non-Final OA dated Apr. 20, 2015.
U.S. Appl. No. 13/614,467, Final OA, dated Jul. 17, 2015, 14 pages.
U.S. Appl. No. 13/614,468, Final OA, dated Aug. 8, 2015, 16 pages.

* cited by examiner

VOLTAGE SCALING SYSTEM WITH SLEEP MODE

CLAIM OF PRIORITY

This application is a continuation application and claims priority to U.S. patent application Ser. No. 13/614,468, filed on Sep. 13, 2012, the entire contents of which are hereby incorporated by reference.

TECHNICAL FIELD

This disclosure relates generally to electronics and more particularly to voltage scaling systems.

BACKGROUND

A system can use a voltage regulator to scale supply voltages. The voltage regulator maintains a constant voltage level until instructed to supply a different voltage level. Generally, transitioning from a voltage value to a lower voltage value can take a significantly longer time than transitioning from the voltage value to a higher voltage value.

By decreasing supply voltages, the system can achieve lower power consumption. When the system dynamically changes a supply voltage, certain operations should be halted until the supply voltage is stabilized. For example, Flash memory data fetches should be halted until the Flash memory is recalibrated with the updated voltage supply value. The time required to stabilize the voltage is generally unpredictable and can have a negative impact on system latency.

SUMMARY

A voltage scaling system can scale a supply voltage while preventing processor access of system components that are rendered unstable from the scaling. A processor receives an instruction to scale a system supply voltage to a target supply voltage. The processor executes the instruction and enters into a sleep mode. The processor can send, to a controller that saves power, an indication that the processor is in the sleep mode. When the processor is in the sleep mode, the processor becomes inactive and cannot access any components, e.g., Flash memory data, of the voltage scaling system. The controller can configure a voltage regulator to scale the system supply voltage to the target supply voltage. Once the target supply voltage is reached, the voltage regulator sends an interrupt to the processor, thereby waking up the processor from the sleep mode.

In one aspect, a method performed by a circuit for scaling voltage includes receiving an instruction to scale a system supply voltage to a target supply voltage; placing a processor into a sleep mode, where the sleep mode halts a clock of the processor; receiving an indication that the processor is in the sleep mode; scaling the supply voltage to the target supply voltage using a voltage regulator; in response to the scaling, waking up the processor from the sleep mode with an interrupt signal, where the interrupt signal is sent by the voltage regulator when the system supply voltage has reached the target supply voltage.

Particular implementations of the voltage scaling system can provide one or more of the following advantages: 1) the voltage scaling system can prevent processor access of components while a system supply voltage is transitioning; and 2) the voltage scaling system can be implemented with low cost by utilizing existing sleep mode and interrupt circuitry.

The details of one or more disclosed implementations are set forth in the accompanying drawings and the description below. Other features, aspects, and advantages will become apparent from the description, the drawings and the claims.

DETAILED DESCRIPTION

Example Voltage Scaling System

Figure 1:
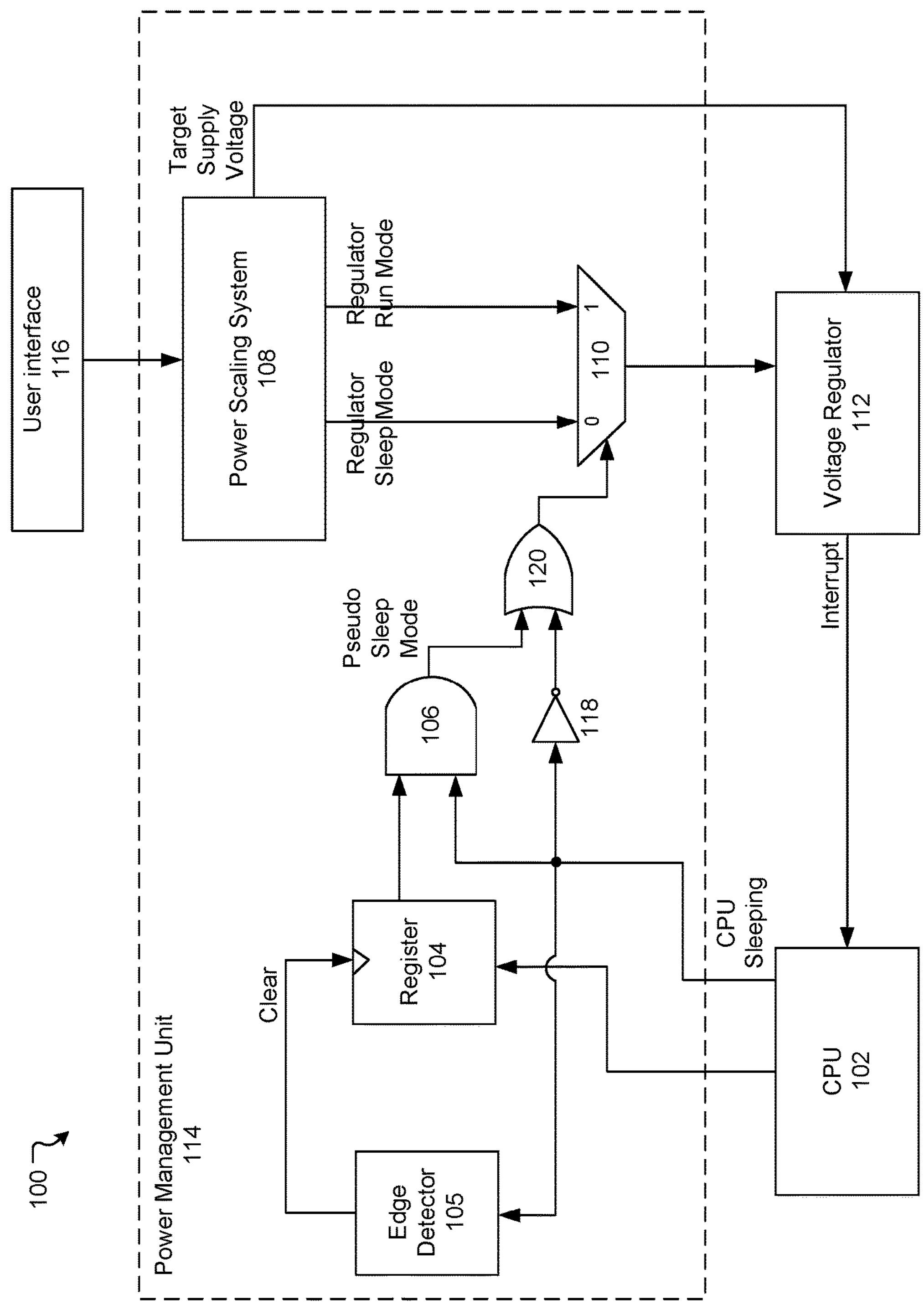
FIG. 1 is a schematic diagram of an example voltage scaling system.

FIG. 1 is a schematic diagram of an example voltage scaling system 100. The voltage scaling system 100 includes a power management unit 114. The power management unit 114 can act as a controller that saves power for the voltage scaling system 100. The voltage scaling system 100 also includes a central processing unit (CPU) 102. The CPU 102 receives and executes instructions of a computer program, e.g., from Flash memory data. The CPU 102 can communicate with the power management unit 114. In particular, the CPU 102 can indicate to the power management unit 114 whether it is in a sleep mode, e.g., through a CPU sleeping flag. In the sleep mode, a clock of the CPU 102 is turned off and the CPU 102 is halted, thereby being unable to access any components, e.g., Flash memory data.

The voltage scaling system 100 includes a voltage regulator 112. The voltage regulator 112 provides a system supply voltage to the voltage scaling system 100 and other systems coupled to the system supply voltage, e.g., a third party chip. The voltage regulator 112 can adjust the system supply voltage upon receiving an instruction, e.g., from the power management unit 114. The voltage regulator 112 can send an interrupt to the CPU 102 when the system supply voltage has finished transitioning to the target supply voltage. The interrupt will be described further below in reference to FIG. 2.

The power management unit 114 includes a register 104. The register 104 can be a control bit that tracks whether the CPU 102 is requesting a voltage scaling. The CPU 102 can drive the register 104 based on instructions that are being executed. If the register 104 is high, the voltage scaling system 100 is or will be transitioning the system supply voltage. If the register 104 is low, the voltage scaling system 100 is not transitioning the system supply voltage.

The power management unit 114 includes an edge detector 105. The edge detector processes, as input, the CPU sleeping flag. Based on the flag, the edge detector 105 can clear the register 104.

The power management unit 114 includes an AND gate 106, a NOT gate 118, and an OR gate 120. The AND gate 106 can have two inputs: 1) output of the register 104, and 2) the CPU sleeping flag. Output of the AND gate 106 can be a first input to the OR gate 120. The CPU sleeping flag can be an input to the NOT gate 118, and an output of the NOT gate 118 can be a second input to the OR gate 120. Output of the OR gate 120 can control operation of a multiplexor 110.

The power scaling system 108 can control an operating mode of the voltage regulator 112. The voltage regulator 112 can operate in a run mode or a sleep mode. In the run mode, the voltage regulator 112 can receive a target supply voltage that is established by a user, e.g., using a user interface 116. For example, the power scaling system 108 can obtain the target supply voltage from the user interface 116 and provide the target supply voltage to the voltage regulator 112. The voltage regulator 112 can execute a power scaling sequence to transition the system supply voltage to the target supply voltage. In the sleep mode, the voltage regulator 112 is inactive or in a low power mode, e.g., a mode that consumes a small amount of current. This can save energy for the voltage scaling system 100.

In some implementations, the power scaling system 108 controls an operating mode of the CPU 102. Similar to the voltage regulator 112, the CPU 102 can also operate in a run mode or in a sleep mode. In the run mode, the CPU 102 and other components coupled to the CPU 102 are active. In the sleep mode, the CPU 102 is halted and no instructions are fetched.

The power scaling system 108 can provide the two operating modes of the voltage regulator 112 as inputs to the multiplexor 110. The multiplexor 110 can use output of the OR gate 120 as a control bit for the multiplexor 110. Therefore, the multiplexor 110 can pass, to the voltage regulator 112, a voltage regulator operating mode based on the output of the OR gate 120. The voltage regulator 112 can operate at a mode specified by the output of the multiplexor 110.

Example Voltage Scaling System Flowchart

Figure 2:
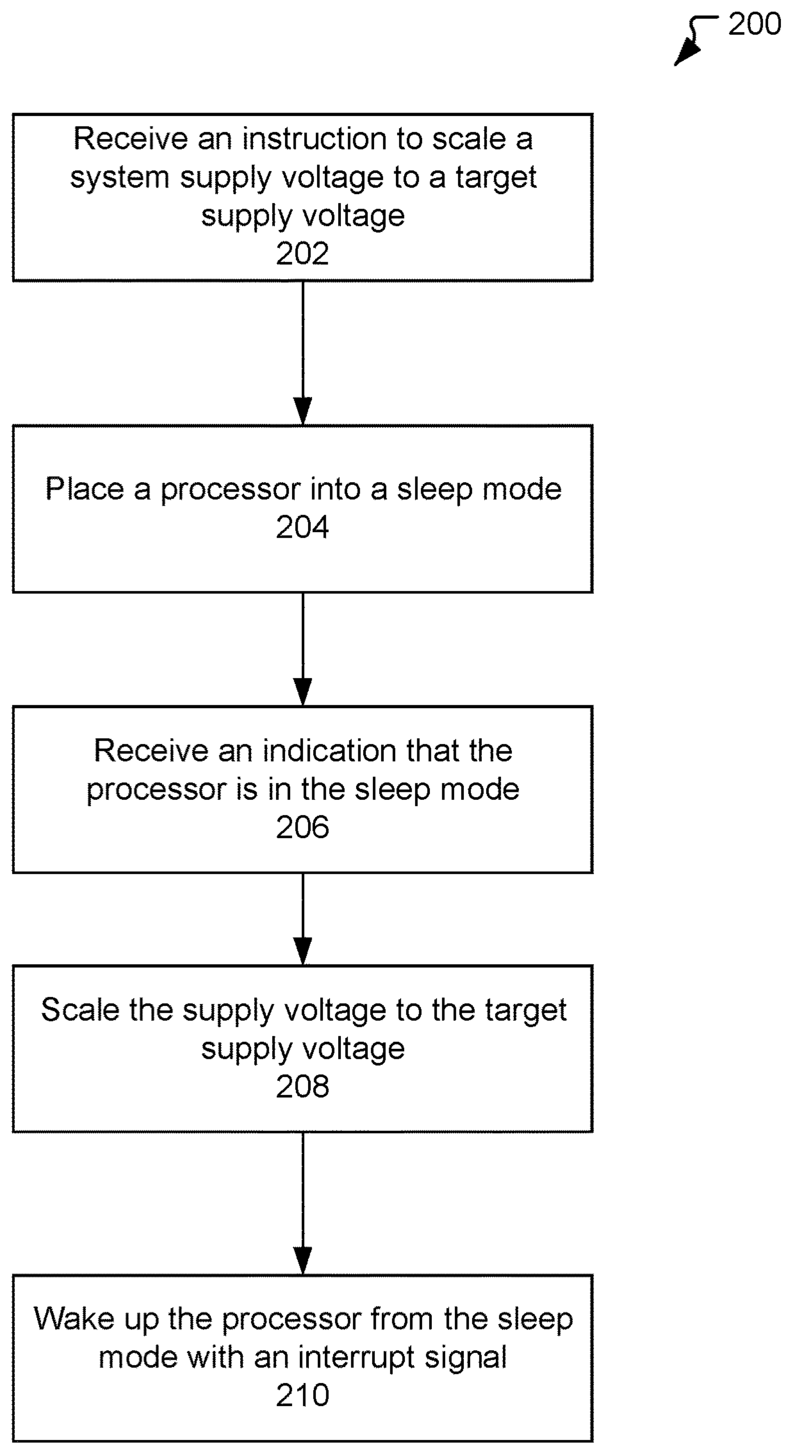
FIG. 2 is a flow diagram of an example process performed by a voltage scaling system.

FIG. 2 is a flow diagram of an example process performed by a voltage scaling system, e.g., the voltage scaling system 100 described above in reference to FIG. 1. A voltage scaling system 100 can receive instructions, e.g., from a user interface or a third party system, to downscale or upscale voltage using a voltage regulator 112 (step 202). The instructions can include a target supply voltage for the voltage regulator 112. Upon receiving the instructions, the voltage scaling system 100 sets a register 104 as high to start a voltage scaling sequence. In some implementations, when the register 104 is set to high, the voltage scaling system 100 can send a sleep instruction to a CPU 102.

The voltage scaling system 100 places the CPU 102 into a sleep mode (step 204) when executing the sleep instruction. When the CPU 102 has entered the sleep mode, a CPU sleeping flag is set to high. The voltage scaling system 100 receives an indication that the CPU 102 is in the sleep mode (step 206). Because output of the register 104 and the CPU sleeping flag are both high, output of the AND gate 106 is also high.

If output of the AND gate 106 is high, a power scaling system 108 of the voltage scaling system 100 enters a pseudo sleep mode. Pseudo sleep mode is similar to a system wide sleep mode except the voltage regulator 112 is in a run mode instead of a sleep mode. The sleep mode can be temporary, e.g., the sleep mode lasts until the voltage regulator has reached a target value. This allows the voltage regulator to transition the system supply voltage while the CPU 102 and other components remain in sleep mode, e.g., inactive. By being inactive, the CPU 102 will not access components that are rendered unstable due to the voltage transition.

The output of the AND gate 106 if a first input to the OR gate 120. The NOT gate 118 inverses the CPU sleeping flag, and output of the NOT gate is a second input to the OR gate 120. That is, if the CPU sleeping flag is low, e.g., the CPU is not sleeping, the NOT gate 118 inverses the low signal and outputs a high signal, which would also cause the OR gate 120 to output a high signal. If the CPU sleeping flag is high and the register 104 is low, the output of the OR gate 120 would be low. If the register 104 is high and the CPU sleeping flag is high, the output of the OR gate 120 would be high.

A power management unit 114 controls operation of the voltage regulator 112. As described above in reference to FIG. 1, the power scaling system 108 of the power management unit 114 provides two possible operating modes for the voltage regulator 112: 1) regulator sleep mode and 2) regulator run mode. The power scaling system 108 passes both modes as inputs to the multiplexor 110. Output of the OR gate 120 acts as a control bit for the multiplexor 110. If the voltage scaling system 100 is in a pseudo sleep mode, e.g., output of the AND gate 106 is high, the multiplexor 110 passes through the regulator run mode to the voltage regulator 112 even if the voltage scaling system 100 is in sleep mode. The voltage regulator 112 then scales the system supply voltage to the target supply voltage (step 208). On the other hand, if the voltage scaling system 110 is not in the pseudo sleep mode, e.g., output of the AND gate 106 is low, the multiplexor 110 passes through the regulator run mode or the regulator sleep mode based on a low or a high CPU sleeping signal, respectively. Output of the multiplexor 110 controls the operating mode of the voltage regulator 112.

In a regulator run mode, once the voltage regulator 112 reaches the target supply voltage, the voltage regulator 112 sends an interrupt signal to the CPU 102 (step 210). The interrupt signal wakes up the CPU 102 from the sleep mode. In some implementations, while in a pseudo sleep mode, the voltage scaling system 100 masks any interrupts except the interrupt from the voltage regulator 112. This can prevent interrupts from being lost. For example, another system, e.g., an alarm, can try to interrupt the CPU 102 in a sleep mode, but the voltage scaling system 100 can mask the interrupt by placing the interrupt in a queue. Once the voltage regulator 112 delivers the interrupt to awaken the CPU 102 from the sleep mode, the voltage scaling system 100 forwards queued interrupts to the CPU 102.

If the CPU 102 is no longer in the sleep mode, the CPU sleeping flag is set to low. The edge detector 105 can detect the falling edge of the CPU sleeping flag and clear the register 104, e.g., set the output of the register 104 as low. The register 104 and CPU sleeping flag both output a low signal, and therefore the output of the AND gate 106 is low. When the output of the AND gate 106 is low, the voltage scaling system 100 exits the pseudo sleep mode.

Example Timing Diagram

Figure 3:
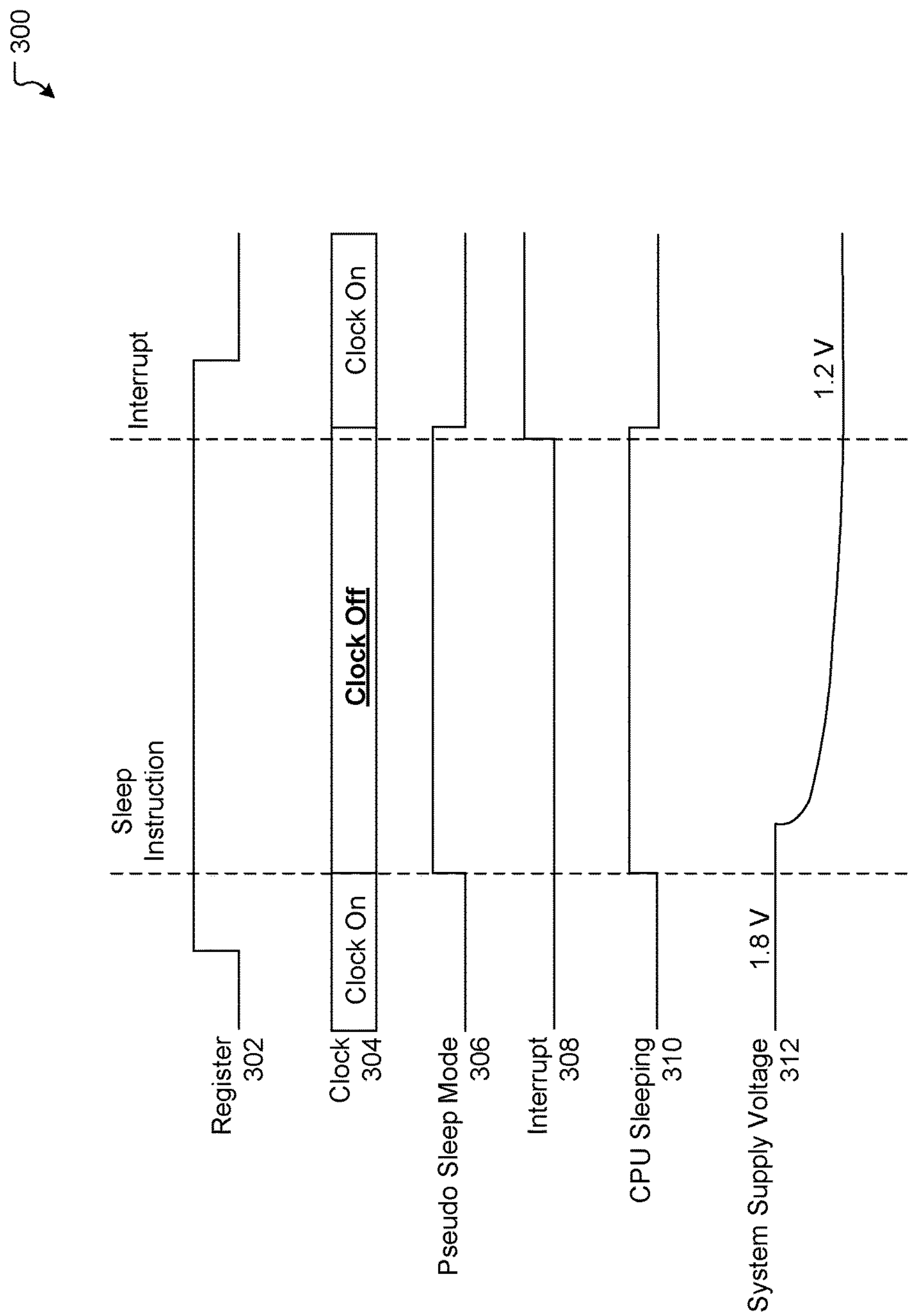
FIG. 3 is an example timing diagram of a voltage scaling system that receives an instruction to downscale a system supply voltage.

FIG. 3 is an example timing diagram 300 of a voltage scaling system that receives an instruction to downscale a system supply voltage. For example, the instruction can be to downscale the system supply voltage from 1.8 Volts to 1.2 Volts. In some implementations, if the instruction is to upscale the system supply voltage, the diagram 300 described below generally applies with the exception of the system supply voltage 312 graph, e.g., the system supply voltage graph 312 will start at a low voltage and transition to a high voltage.

Once the voltage scaling system receives the instruction, a register 302 becomes high. A clock 304 of a CPU is on. A pseudo sleep mode flag 306, an interrupt from the voltage regulator 308, and a CPU sleeping flag 310 are low. The pseudo sleep mode flag 306 represents an output of an AND gate, e.g., as described above in reference to FIGS. 1 and 2, of the voltage scaling system. A system supply voltage 312 is high, e.g., 1.8 Volts.

A CPU can execute a sleep instruction after the register 302 becomes high. Once the sleep instruction is executed, the clock 304 can turn off. As a result, the CPU sleeping flag 310 becomes high. Because both the register 302 and the CPU sleeping flag 310 are high, the pseudo sleep mode 306 is high. In pseudo sleep mode 306, the voltage regulator is in a run mode and, based on the received instruction, starts downscaling the system supply voltage 312. As shown in the diagram, downscaling the system supply voltages occurs gradually and not instantaneously, and the CPU is inactive during the downscaling. If the CPU is inactive, the clock is frozen and data fetch, e.g., instructions in Flash memory, is halted.

As soon as the voltage regulator reaches the target supply voltage, e.g., 1.2 Volts, the voltage regulator sends an interrupt 308, e.g., the interrupt 308 becomes high, to the CPU. The CPU exits sleep mode upon receipt of the interrupt. This causes the clock 304 to turn on and the CPU sleeping flag 310 to become low. When the CPU sleeping flag 310 becomes low, an edge detector detects the falling edge and clears the register 302, thereby setting the register 302 to low. Pseudo sleep mode 306 becomes low once the CPU sleeping flag 310 is low. Once the voltage scaling system exits pseudo sleep mode 306, the CPU continues executing instructions and the voltage regulator remains in run mode because the CPU sleeping flag 310 is low. In some implementations, as shown in the timing diagram 300, rising and falling edges, e.g., the falling edge of pseudo sleep mode 306 and the falling edge of CPU sleeping flag 310, are slightly delayed due to processing delay by the voltage scaling system.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method for voltage scaling, comprising:

receiving, at a circuit, an instruction to scale a system supply voltage to a target supply voltage;

based on receiving the instruction:

triggering a register to provide a first signal as an output of the register, wherein triggering the register to provide the first signal comprises:

configuring the register to be in a first state upon receipt of the instruction to scale the system supply voltage to the target supply voltage, and providing the first signal as the output of the register when the register is in the first state, and placing a processor into a sleep mode, where the sleep mode halts a clock of the processor;

in response to placing the processor in the sleep mode, generating a control signal to trigger a voltage regulator to scale the system supply voltage to the target supply voltage, wherein generating the control signal is based at least in part on the first signal provided as the output of the register;

controlling the voltage regulator based on the control signal; and scaling the system supply voltage to the target supply voltage using the voltage regulator in response to controlling the voltage regulator based on the control signal.

2. The method of claim 1, wherein generating the control signal comprises:

in response to receiving the instruction, providing the first signal to a logic circuit;

in response to placing the processor in the sleep mode, providing a second signal to the logic circuit, wherein the second signal is distinct from the first signal; and outputting the control signal by the logic circuit upon receiving the first signal and the second signal.

3. The method of claim 1, wherein configuring the register to be in the first state comprises:

receiving, at an edge detector, a signal indicating that the processor is in the sleep mode; and configuring, by the edge detector, the register to be in the first state.

4. The method of claim 1, further comprising:

in response to scaling the system supply voltage to the target supply voltage, generating an interrupt signal by the voltage regulator; and waking up the processor from the sleep mode using the interrupt signal.

5. The method of claim 4, further comprising:

masking any interrupt other than the interrupt signal from the voltage regulator when the processor is in the sleep mode.

6. The method of claim 4, wherein waking up the processor from the sleep mode comprises:

detecting, by an edge detector, a signal indicating that the processor is waking up from the sleep mode;

based on the detection, clearing a register; and in response to clearing the register, terminating provision of the control signal to the voltage regulator.

7. The method of claim 1, wherein controlling the voltage regulator based on the control signal comprises:

receiving the control signal at a multiplexor coupled to the voltage regulator, wherein the multiplexor receives as inputs signals from a power scaling system that correspond to a run operating mode and a sleep operating mode of the voltage regulator, wherein the voltage regulator transitions the system supply voltage to the target supply voltage in the run operating mode and is inactive in the sleep operating mode; and in response to receiving the control signal, outputting, by the multiplexor to the voltage regulator, the signal corresponding to the run operating mode.

8. The method of claim 1, where receiving the instruction comprises:

receiving, through a user interface associated with the circuit, a user input providing the instruction.

9. A system comprising:

a control circuit configured to:

receive an instruction to scale a system supply voltage to a target supply voltage;

based on receiving the instruction:

trigger a register to provide a first signal as an output of the register, wherein triggering the register to provide the first signal comprises:

operating the register in a first state upon receipt of the instruction to scale the system supply voltage to the target supply voltage; and provide the first signal as the output of the register when the register is in the first state, and place a processor into a sleep mode, where the sleep mode halts a clock of the processor; and in response to receiving an indication that the processor is in the sleep mode, generate a control signal to trigger a voltage regulator to scale the system supply voltage to the target supply voltage, wherein generating the control signal is based at least in part on the first signal provided as the output of the register; and the voltage regulator configured to:

scale the system supply voltage to the target supply voltage in response to receiving the control signal.

10. An apparatus, comprising:

a processor that is configured to enter into a sleep mode based on receiving an instruction to scale a system supply voltage to a target supply voltage, where the sleep mode halts a clock of the processor;

a control circuit configured to:

receive the instruction to scale the system supply voltage to the target supply voltage;

based on receiving the instruction:

trigger a register to provide a first signal as an output of the register, wherein triggering the register to provide the first signal comprises:

operating the register in a first state upon receipt of the instruction to scale the system supply voltage to the target supply voltage, and provide the first signal to a logic circuit as the output of the register when the register is in the first state, and place the processor in the sleep mode; and in response to receiving an indication that the processor is in the sleep mode, generate a control signal to trigger a voltage regulator to scale the system supply voltage to the target supply voltage, wherein generating the control signal is based at least in part on the first signal provided as the output of the register; and the voltage regulator configured to:

receive the control signal from the control circuit; and scale the system supply voltage to the target supply voltage in response to receiving the control signal from the control circuit.

11. The apparatus of claim 10, wherein the control circuit includes the logic circuit, the logic circuit configured to:

receive the first signal provided as the output of the register;

receive a second signal in response to placing the processor in the sleep mode, where the second signal is distinct from the first signal; and output the control signal upon receiving the first signal and the second signal.

12. The apparatus of claim 10, further comprising an edge detector that is configured to:

receive a signal indicating that the processor is in the sleep mode; and configure the register to be in the first state upon receiving the signal indicating that the processor is in the sleep mode.

13. The apparatus of claim 11, wherein the logic circuit comprises:

an AND gate that is configured to:

receive, as a first input, the first signal from the register;

receive, as second input, the second signal indicating that the processor in the sleep mode; and provide an output to an OR gate;

a NOT gate that is configured to receive as input the second signal indicating that the processor in the sleep mode; and the OR gate that is configured to:

receive the output of the AND gate as a first input and the output of the NOT gate as a second input; and generate the control signal as an output.

14. The apparatus of claim 10, wherein the voltage regulator is further configured to generate an interrupt signal in response to scaling the system supply voltage to the target supply voltage, and wherein the interrupt signal is configured to wake up the processor from the sleep mode.

15. The apparatus of claim 14, further comprising an edge detector that is configured to:

detect a signal indicating that the processor is waking up from the sleep mode;

based on the detection, clear the register; and in response to clearing the register, terminate provision of the control signal to the voltage regulator.

16. The apparatus of claim 10, further comprising a power scaling system that is configured to:

generate a run signal that correspond to a run operating mode of the voltage regulator, wherein the voltage regulator transitions the system supply voltage to the target supply voltage in the run operating mode; and generate a sleep signal that correspond corresponds to a sleep operating mode of the voltage regulator, wherein the sleep operating mode renders the voltage regulator inactive or operating with low power.

17. The apparatus of claim 16, further comprising a multiplexor that is coupled to the voltage regulator, the multiplexor configured to:

receive, as inputs, the run signal and the sleep signal from the power scaling system;

receive the control signal as a control for an output of the multiplexor; and in response to receiving the control signal, output, to the voltage regulator, the run signal corresponding to the run operating mode.

18. The apparatus of claim 17, wherein the power scaling system is further configured to provide the target supply voltage to the voltage regulator.

19. The apparatus of claim 10, wherein the voltage regulator is configured to scale the system supply voltage to the target supply voltage when the processor is in the sleep mode.

20. The apparatus of claim 10, where receiving the instruction comprises:

receiving, through a user interface associated with the apparatus, a user input providing the instruction.

* * * * *